US006804541B1

(12) United States Patent
Muramatsu et al.

(10) Patent No.: US 6,804,541 B1
(45) Date of Patent: Oct. 12, 2004

(54) PC CARD INTEGRATED RADIO COMMUNICATION APPARATUS

(75) Inventors: Fumihiro Muramatsu, Shizuoka (JP); Iwao Matsuura, Kanagawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 348 days.

(21) Appl. No.: 09/595,203

(22) Filed: Jun. 16, 2000

(30) Foreign Application Priority Data

Jun. 18, 1999 (JP) ............................................ 11-172878

(51) Int. Cl.⁷ .............................. H04B 1/38; G06F 1/28; G06F 1/30; G06F 1/32
(52) U.S. Cl. ......................... 455/573; 455/54; 455/557; 455/90.1; 455/90.2; 455/90.3; 455/73; 455/558; 455/573; 713/302; 713/320; 713/321; 713/322; 713/323
(58) Field of Search ............................. 455/90.1–90.3, 455/73, 574, 557, 573, 558, 572; 713/320–323, 302

(56) References Cited

U.S. PATENT DOCUMENTS

| | | | | |
|---|---|---|---|---|
| 5,357,187 A | * | 10/1994 | Park .......................... 320/116 |
| 5,444,869 A | * | 8/1995 | Stricklin et al. ............. 455/575 |
| 5,809,115 A | * | 9/1998 | Inkinen ..................... 379/93.05 |
| 5,913,174 A | * | 6/1999 | Casarez et al. .............. 455/557 |
| 6,016,549 A | * | 1/2000 | Matsushiba et al. ........ 713/324 |
| 6,026,119 A | * | 2/2000 | Funk et al. .................. 375/222 |
| 6,052,565 A | * | 4/2000 | Ishikura et al. ............. 455/6.71 |
| 6,149,319 A | * | 11/2000 | Richter et al. ............... 713/300 |
| 6,157,316 A | * | 12/2000 | Okayama et al. .......... 340/7.32 |
| 6,182,205 B1 | * | 1/2001 | Le Roux et al. .............. 712/38 |
| 6,327,635 B1 | * | 12/2001 | Alston et al. ................ 710/301 |
| 6,459,175 B1 | * | 10/2002 | Potega ....................... 307/149 |

FOREIGN PATENT DOCUMENTS

CN    1207641 A    2/1999

* cited by examiner

Primary Examiner—Vivian Chin
Assistant Examiner—Yuwen Pan
(74) Attorney, Agent, or Firm—Pearne & Gordon LLP

(57) ABSTRACT

PC card integrated radio communication apparatus is provided wherein the service hour is prolonged and battery charge is made possible in the operating state where current consumption of the radio communication section is small, by controlling power distribution to each section of the apparatus and to control battery charge for power supply from a PC card slot and power supply from a battery, depending on the power supply state of the personal computer and operating state of the apparatus. The circuit configuration includes switch circuits (C23, C24, C19, C18) so that power source for respective power circuits (C16, C22) of the radio communication section (C1) and the modem section (C2) can be selected from the PCMCIA I/F (b1) of a personal computer or a signal, or both of them simultaneously. This allows selection of the optimum power supply mode depending on the connection mode and operating state of the apparatus. The circuit configuration also includes a charger circuit (C110) thus allowing charge of the battery (C3) via power supply from the PCMCIA I/F (b1) in a state where operating current of the apparatus is small.

19 Claims, 3 Drawing Sheets

PC CARD INTEGRATED RADIO COMMUNICATION APPARATUS

BACKGROUND OF THE INVENTION

The present invention relates to PC card integrated radio communication terminal apparatus which has integrated a radio communication unit such as a portable telephone set and a PC card type modem. The invention is contemplated, particularly for power supply from a PC card slot and power supply from a battery, to control power distribution to each section of the apparatus and to control battery charge.

Radio communication terminal apparatus which has integrated a PC card type modem and a radio communication unit, as known from JP-A-8-340389, is adapted to be used as a portable telephone set when separately used as a terminal, and to be used as data communication terminal apparatus when the apparatus is connected via a personal computer and the PCMCIA interface (I/F).

FIG. 3 shows the configuration of a conventional PC card integrated radio communication apparatus (a). The conventional PC card integrated radio communication apparatus (a) is composed of a modem section (a2), a radio communication section (a1), a battery (a3), and an antenna (a4).

The radio communication section (a1) is composed of a radio control circuit (a11), a transceiver circuit (a12), and a power supply circuit (a13).

The modem section is composed of a modem circuit (a21) and a power supply circuit (a22).

It is contemplated that the voltage of the battery (a3) is supplied to the radio communication section (a1) alone and not to the modem section (a2).

It is contemplated that the voltage is supplied from the power supply terminal of the PCMCIA slot (b1) to the modem section (a2) alone and not to the radio communication section (a1) in a state where the PC card integrated radio communication unit (a) is inserted in the PCMCIA slot (b1) of the personal computer (b).

As mentioned above, conventional PC card integrated radio communication apparatus can use a battery alone for power supply to the radio communication section, in a state where the apparatus is attached to a personal computer. Thus the service hour of the PC card integrated radio communication apparatus is determined by the discharge capacity of the battery.

In conventional PC card integrated radio communication apparatus, the power supply circuit was simplified so that the battery was dedicated for the radio communication section and the power for the PC card slot was dedicated for the modem section.

Thus no voltage is supplied from the PC card slot of a personal computer and service hour of the apparatus cannot be prolonged.

SUMMARY OF THE INVENTION

The invention, concerning the above problems, aims at providing PC card integrated radio communication apparatus wherein service hour is prolonged and battery charge is made possible in the operating state where current consumption of the radio communication section is small, by controlling power distribution to each section of the apparatus and to control battery charge for power supply from a PC card slot and power supply from a battery, depending on the power supply state of the personal computer and operating state of the apparatus.

To solve the problems, as described in the first aspect of the invention, PC card integrated radio communication apparatus is devised, having a battery, a radio communication section and a modem section integrated into a PC card, in that the apparatus is equipped with insertion/non-insertion state detection means for detecting the insertion/non-insertion state of the radio apparatus into a PC card slot; power supply mode selection/power supply means for selecting the power supply mode of the power supply from the battery and/or power supply from the PC card slot depending on the insertion/non-insertion state and the connection state of the radio communication device including attachment of the battery and the operating states of the radio communication section and the modem section to supply power; and charge means for recharging the battery via power supply from the PC card slot, after checking the state of the radio communication section while the insertion/non-insertion state detection means is detecting the insertion state, wherein service hour is prolonged and battery charge is made possible in the operating state where current consumption of the radio communication section is small, by controlling power distribution to each section of the apparatus or to control battery charge for power supply from a PC card slot and power supply from a battery, depending on the power supply state of the personal computer and operating state of the apparatus.

As described in the second aspect of the invention, PC card integrated radio communication apparatus according to the first aspect of the invention is devised, in that the power supply mode selection/power supply means shuts off power supply from the battery to the modem section while the insertion/non-insertion state detection means is detecting the non-insertion state, wherein power supply to the modem section is shut off to reduce current consumption in the apparatus in a state where the PC card integrated radio communication apparatus is not attached to the PC card slot.

As described in the third aspect of the invention, PC card integrated radio communication apparatus according to the first aspect of the invention is devised, in that the power supply mode selection/power supply means supplies power to the modem section and radio communication section from the PC card slot as well as shuts off power supply from the battery while the insertion/non-insertion state detection means is detecting the insertion state and the radio communication section is in the non-communication state, wherein power supply from the PC card slot is capable of supplying power to operate the PC card integrated radio communication apparatus in a state where the current consumption of the radio communications section is small, such as the non-communication state, and wherein battery discharge can be prevented and apparatus operation can be maintained by supplying power from the PC card slot to the modem section and radio communication section of the PC card integrated radio communication apparatus as well as shutting off power supply from the battery.

As described in the fourth aspect of the invention, PC card integrated radio communication apparatus according to the first aspect of the invention is devised, in that the apparatus has means for detecting whether the battery is attached or not and the power supply mode selection/power supply means shuts off power supply from the PC card slot while the insertion/non-insertion state detection means is detecting the insertion state and the battery is removed, wherein the apparatus detects that the battery is removed and deactivates the entire apparatus by shutting off power supply from the PC card slot thus preventing malfunction of the apparatus.

As described in the fifth aspect of the invention, PC card integrated radio communication apparatus according to the first aspect of the invention is devised, in that the power supply mode selection/power supply means supplies power from the PC card slot and the charge means recharges the battery while the insertion/non-insertion state detection means is detecting the insertion state and the radio communication section is in the non-operating state or non-communication state, wherein power supply from the PC card slot is capable of supplying power to operate the PC card integrated radio communication apparatus in a state where the current consumption of the radio communications section is small, such as the non-operating state before the apparatus is powered or non-communication state, and capable of recharging the battery with extra power.

As described in the sixth aspect of the invention, PC card integrated radio communication apparatus according to the first aspect of the invention is devised, in that the power supply mode selection/power supply means selects power supply from the PC card slot and the battery to supply power to the radio communication section while the insertion/non-insertion state detection means is detecting the insertion state and the radio communication section is in the communication state, wherein discharge current from the battery is reduced to prolong service hour of the apparatus in a communication state where current consumption of the radio communication section is relatively large, by supplying power simultaneously from the PC card slot and the battery.

As described in the seventh aspect of the invention, PC card integrated radio communication apparatus according to the first aspect of the invention is devised, in that the power supply mode selection/power supply means shuts off power supply to the modem section while the insertion/non-insertion state detection means is detecting the insertion state and the radio communication section is in the speech communication state, wherein current consumption of the apparatus can be reduced by shutting off power supply to the modem section because conversation is possible via the radio communication section alone in the speech communication state.

As described in the eighth aspect of the invention, PC card integrated radio communication apparatus according to the first aspect of the invention is devised, in that the power supply mode selection/power supply means supplies power to the modem section and radio communication section from the battery as well as shuts off power supply from the PC card slot while the insertion/non-insertion state detection means is detecting the insertion state and in case where a control signal or command is given to the power supply mode selection/power supply means from a personal computer connected via the PC card slot, wherein current consumption of the personal computer is reduced by supplying power to the modem section also from the battery in the apparatus in a state where the personal computer is operating from the battery built into the personal computer alone and the battery built into the personal computer is weak, thus prolonging the service hour in total.

As described in the ninth aspect of the invention, PC card integrated radio communication apparatus according to the first aspect of the invention is devised, in that the power supply mode selection/power supply means supplies power to the modem section and radio communication section from the PC card slot as well as shuts off power supply from the battery while the insertion/non-insertion state detection means is detecting the insertion state and the radio communication section is in the continuous reception state, wherein the power supply does not require a large current supply capability because no transmission is made in the continuous reception state during packet communication, and the apparatus is operable from power supply from the PC card alone in this state thus communication can be maintained without power supply from the battery.

DETAILED DESCRIPTION OF THE PREFERRED EMBODIMENTS

Embodiments of the invention are explained below by using FIG. 1 and FIG. 2.

The PC card integrated radio communication apparatus according to embodiments of the invention can select power supply to each section of the apparatus from among three power supply modes: "power supply from PC card slot," "power supply from battery," and "simultaneous power supply from PC card slot and battery." When the radio communication section (C1) is in the non-communication state, the apparatus can shut off "power supply from battery" and use "power supply from PC card slot" alone and can recharge the battery via "power supply from PC card slot." When the radio communication section is in the communication state, the apparatus can operate from "simultaneous power supply from PC card slot and battery." Further, when the radio communication section is in the speech communication state, the apparatus can shut off power supply to the modem section. Moreover, when the battery is removed, the apparatus can shut off "power supply from PC card slot." The apparatus, receiving an instruction from a personal computer while in operation, can switch the power supply to each section of the apparatus from "power supply from PC card slot" or "simultaneous power supply from PC card slot and battery" to "power supply from battery."

The PC card integrated radio communication apparatus is adapted to shut off power supply from the battery to the modem section in the state where the radio communication apparatus is not inserted in the PC card slot.

Thus, a feature of selecting the power supply mode from power supply from battery and/or PC card slot to supply power depending on the connection state of the PC card integrated radio communication apparatus and operating state of the radio communication section and the modem section is called a "power supply mode selection/power supply means."

Figure 1:
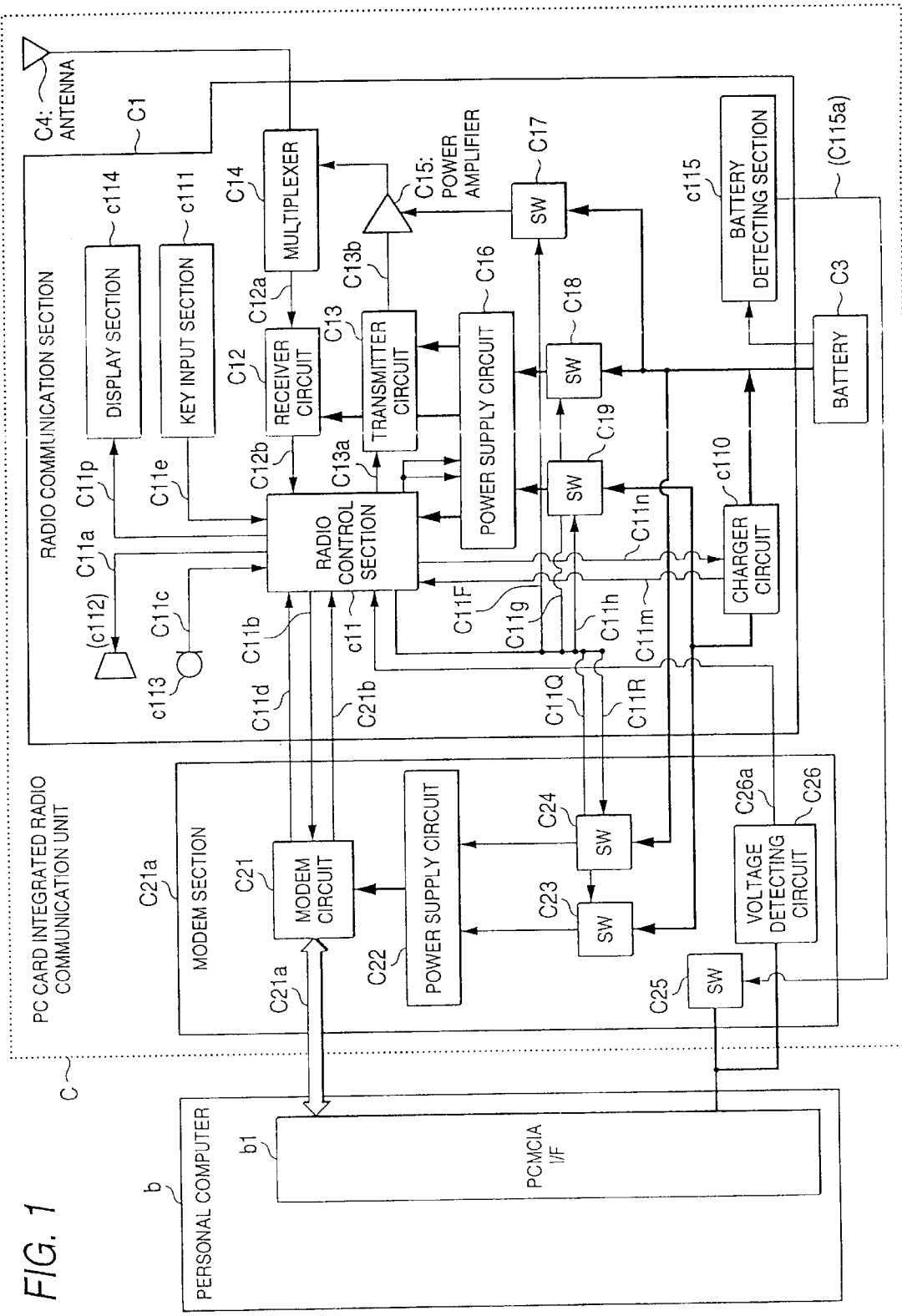
FIG. 1 shows the circuit configuration of the PC card integrated radio communication apparatus according to embodiments of the invention.
Figure 2:
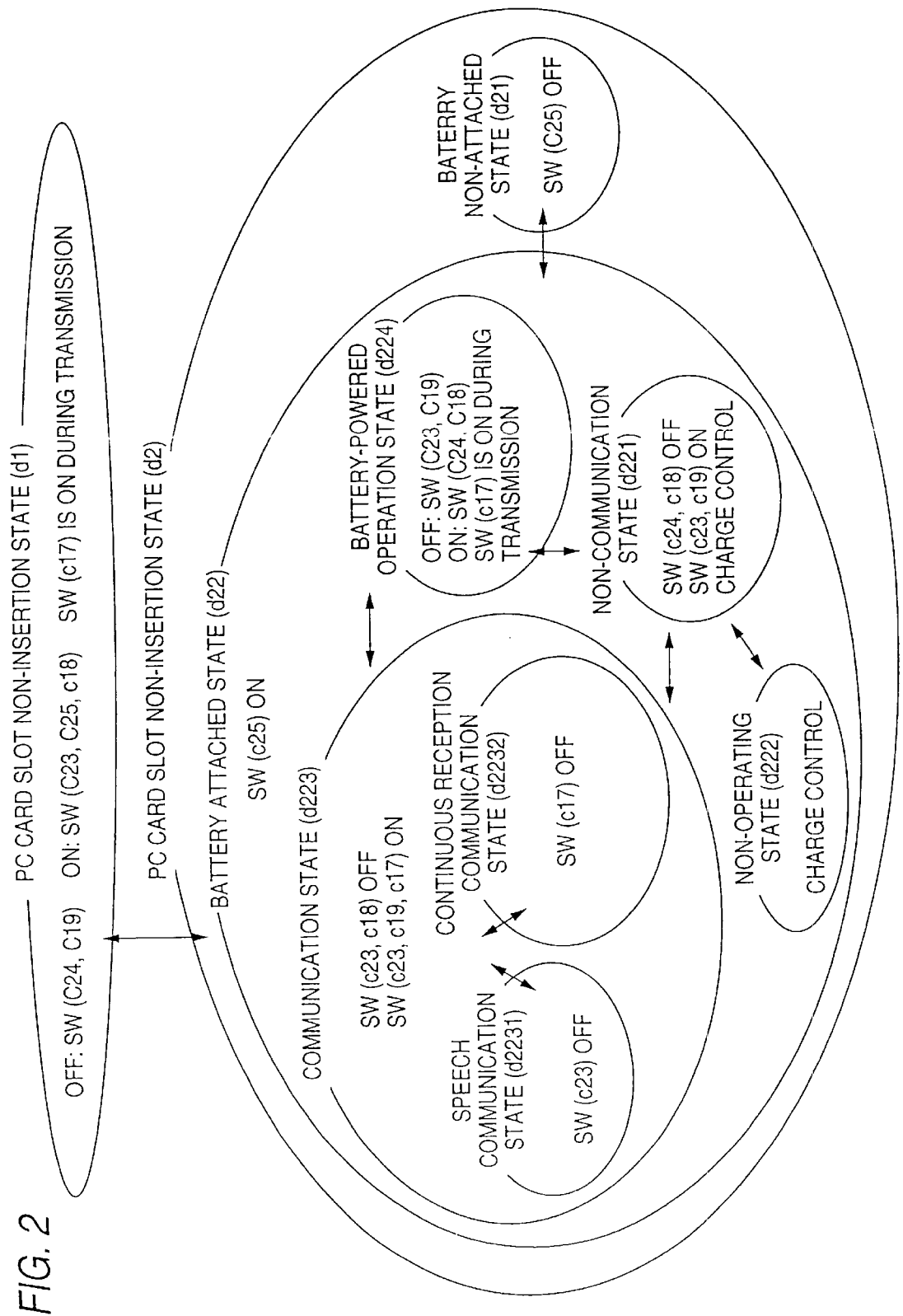
FIG. 2 is the state transition diagram which shows transition of the operating state of the PC card integrated radio communication apparatus.
Figure 3:
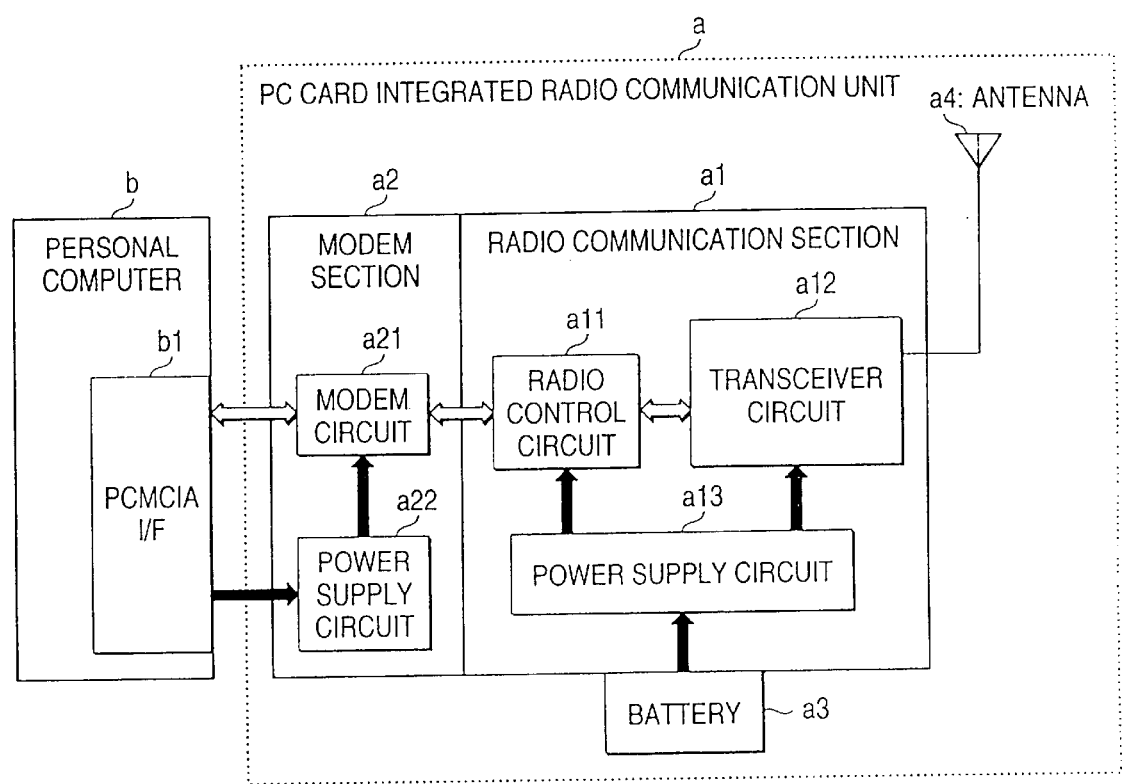
FIG. 3 shows the configuration of conventional apparatus.

FIG. 1 shows the circuit configuration of the PC card integrated radio communication unit (C) according to embodiments of the invention. In one embodiment, PC card integrated radio communication unit (C) is electrically and physically connected to a personal computer (b) via PCM-CIA I/F (b1) and used as data communication apparatus. In another embodiment, PC card integrated radio communication unit (C) is used separately as a portable telephone set.

The PC card integrated radio communication unit (C) is composed of a radio communication section (C1), a modem section (C2), a battery (C3), and an antenna (C4).

The radio communication section (C1) is composed of a radio control circuit (C11), a receiver circuit (C12), a transmitter circuit (C13), a multiplexer (C14), a power amplifier (C15), a power supply circuit (C16), a switch circuit (C17), a switch circuit (C18), a switch circuit (C19), a charger circuit (C110), a key input section (C111), a receiver (C112), a microphone (C113), and a display section (C114).

The radio control circuit (C11) is composed of a microprocessor, a memory, an input/output circuit, and a speech processing circuit, none of which are shown, and controls the entire PC card integrated radio communication unit (C).

The PC card integrated radio communication unit (C) communicates via the PDC system. The radio control circuit (C11) controls the radio communication procedures of the PDC system to realize communications. The radio communication procedures of the PDC system is well known and will not be detailed.

The receiver circuit (C12) detects a receive high-frequency signal (c12a) received via the multiplexer (C14) from the antenna (C4) then demodulates the high-frequency signal (c12a) to a digital signal. In case where demodulated digital data (c12b) is a sound signal, sound decoding processing is performed by the speech processing circuit in the radio control circuit (C11), then converted to a receive analog sound signal (c11a) and sent to the receiver (C112). In case where demodulated digital data (c12b) is a non-sound signal, the data is sent to the modem circuit (C21) as a receive non-sound signal (c11b).

The transmit analog sound signal (c11c) is converted to a digital sound signal by the speech processing circuit in the radio control circuit (C11), then sent to the transmitter circuit (C13) as a transmit digital signal (c13a). The transmit non-sound signal (c11d) is sent to the transmitter circuit (C13) via the radio control circuit (C11) as a transmit digital signal (c13a).

The transmitter circuit (C13) converts the transmit digital signal (c13a) to a transmit high-frequency signal (c13b) and sends the transmit high-frequency signal (c13b) to the power amplifier (C15). The power amplifier (C15) amplifies the transmit high-frequency signal (c13b) to a predetermined power and sends the resulting signal via the multiplexer (C14) and the antenna (C4).

The power supply circuit (C16) is a circuit which supplies a stable constant voltage to the receiver circuit (C12) and the transmitter circuit (C13). The switch circuit (C17) is a circuit for supplying or shutting down the power of the battery (C3) to the power amplifier (C15). The switch circuit (C19) is a circuit for supplying or shutting down the power from the PCMCIA I/F (b1) to the power supply circuit (C16).

These switch circuits (C17, C18, C19) are controlled to open or close by the radio control circuit (C11) via respective switch control signals (c11f, c11g, c11h). The switch circuit (C17) is controlled to stay on during transmission alone so that power consumption during non-transmission interval is reduced.

The charger circuit (C110) is a circuit for recharging a battery with constant voltage and constant current by converting the power from the PCMCIA I/F (b1) to a constant-voltage and constant-current power then supplies the resulting power to the battery (C3). The supply current capability of the charger circuit (C110) is set to a current value which does not exceed the current supply capability of the PCMCIA I/F (b1). Start and stop of charge is controlled via a charge control signal by the radio control circuit (C11). The charger circuit (C110), on detecting a charge end current use as completion conditions for constant-voltage, constant-current charge, sends a charge end detection signal (c11m) to the radio control circuit (C11).

The radio control circuit (C11), based on the input information entered from the key input section (C111), sends the display information (clip) to the display section (C114) for display of miscellaneous information.

The battery detecting section (C115) has a feature of detecting whether a battery (C3) is attached or not. The battery detecting section (C115) is composed of a microswitch and sends a detection signal (c115a).

The modem section (C2) has a feature of coding/decoding non-sound data received at the radio communication section (C1) or non-sound data sent from the PCMCIA I/F (b1) of a personal computer, based on the MNP standard.

The modem section (C2) is composed of a modem circuit (C21), a power supply circuit (C22), a switch circuit (C23), a switch circuit (C24), a switch circuit (C25), and a voltage detecting circuit (C26). The modem circuit (C21) is composed of a microcomputer, a memory, and an input/output circuit, none of which are shown, and has a feature of coding/decoding non-sound data based on the MNP standard and sending/receiving data between the personal computer (b) and the radio communication section (C1).

The modem circuit (C21) sends/receives non-sound data to/from the personal computer and receives modem control data and control data of the radio communication section (C1) from the personal computer via the PCMCIA I/F (b1) bus. The modem circuit (C21) sends the control data of the radio communication section (C1) received from the personal computer to the radio control circuit (C11) via a control signal (c21b). The power supply circuit (C22) is a circuit for supplying a stable constant voltage to the modem circuit (C21).

The switch circuit (C24) is a circuit for supplying/shutting off the power of the battery (C3) to the power supply circuit (C22). The switch circuit (C23) is a circuit for supplying/shutting off the power from the PCMCIA I/F (b1) to the power supply circuit (C22). These switch circuits (C23, C24) are controlled to open or close by the radio control circuit (C11) via respective switch control signals (c11Q, c11R).

The switch circuit (C25) is a circuit for supplying/shutting off the power from the PCMCIA I/F (b1) to the modem section (C2) and the radio communication section (C1). The switch circuit (C25) is controlled by the detection signal (c115a) of the battery detecting section (C115) and is turned off in the state where the battery (C3) is removed and turned on in the state where the battery (C3) is attached.

The voltage detecting circuit (C26) is a circuit for detecting whether the PC card integrated radio communication unit (C) of the invention has been inserted in the PCMCIA I/F (b1) slot. When this is the case, the voltage detecting circuit (C26) detects the supplied voltage and notifies, via an insertion detecting signal (c26a), the radio control circuit (C11) whether the apparatus main unit is inserted or not inserted.

Operation of the PC card integrated radio communication unit (C) of the invention is explained below by using the operating state transition diagram in FIG. 2.

In case where the radio control circuit has recognized that the apparatus (C) is in the non-insertion state via the insertion detecting signal (c26a), the apparatus (C) makes transition to the PC card slot non-insertion state (d1). In this state, the radio control circuit (C11) makes control to supply power to necessary sections alone by turning off switch circuits (C24, C19) and supplying the power of the battery (C3) to the radio communication section (C1) alone, as well as supply the power from the PCMCIA I/F (b1) to the modem section (C2) in case where the apparatus is inserted in the PCMCIA I/F (b1) slot.

In case where the radio control circuit has recognized that the apparatus (C) is in the insertion state via the insertion detecting signal (c26a), the apparatus (C) makes transition to the PC card slot insertion state (d2). In case where the battery (C3) is removed in this state, the apparatus (C) makes transition to the battery non-attached state (d21). In this state, on detection of removal of the battery (C3) by the battery detecting section (C115), control is made to turn off the switch circuit (C25) and shut off all power supply to the PC card integrated radio communication unit. Thus the apparatus is inoperable in the state where the battery is removed. This prevents malfunction due to sending operation using power supply from the PCMCIA I/F (b1) alone, or malfunction of the personal computer (b) due to large current during sending operation.

In case where the battery (C3) is attached in the PC card slot insertion state (d2), the apparatus (C) makes transition to the battery attached state (d22). In this state, control is made by the battery detecting section (C115) to turn on the switch circuit (C25) thus allowing power supply from the PCMCIA I/F (b1). The apparatus stays inoperable, i.e., stays in the non-operating state (d222) even when the battery (C3) is just attached. The apparatus makes transition to the non-communication state (d221) when the power switch (not shown) associated with the key input section is turned on. The apparatus returns to the non-operating state (d222) when the power switch is turned off.

When the apparatus is powered via the power switch, the radio control circuit (C11) performs awaiting operation or out-of-the-coverage awaiting operation via the PDC system communication control means to place the apparatus in the non-communication state (d221). The radio control circuit (C11) makes control to turn off switch circuits (C24, C18) and turn on switch circuits (C23, C19). In this way, the radio control circuit (C11) can save current consumption of the battery by supplying power from the PCMCIA I/F (b1) alone in the non-communication state where current consumption of the apparatus is small.

The radio control circuit (C11) performs charge control of the battery (C3) via the charger circuit (C110) in the non-communication state (d221) or non-operating state (d222). In this way, the radio control circuit (C11) recharges the battery (C3) via power supply from the PCMCIA I/F (b1) in the non-communication state or non-operating state (d222) where current consumption of the apparatus is small.

In case where the apparatus has made transition from the non-communication state (d221) or non-operating state (d222) to another state, the radio control circuit (C11) controls the charger circuit (C110) so that charge operation is immediately halted.

This apparatus, on call origination via key input or call termination from the network, makes transition to the communication state (d223). The radio control circuit (C11) makes control to turn off switch circuits (C24, C18) and turn on switch circuits (C23, C19, C17). In this way, the apparatus receives power supply simultaneously from the battery (C3) and the PCMCIA I/F (b1).

In case where the apparatus is in the communication state (d223) and communication data is sound data, the radio communication section (C11) is placed in the speech communication state (d2231) and makes control to turn off the switch circuit (C23). In this way, it is contemplated to shut off power supply to the modem section (C2) which need not operate in speech communications.

Further, the apparatus may be placed in the continuous reception communication state (d2232) where continuous reception is performed and transmission is not performed, such as a state where high-capacity files are continuously downloaded. In this state, the radio control circuit (C11) makes control to turn off the switch circuit (C17) to shut down power supply from the battery (C3) and operates on power supply from the PCMCIA I/F (b1) alone.

In case where the radio control circuit (C11) has received a battery-powered operation instruction via the PCMCIA I/F (b1), bus (c21a), modem circuit (C21) and control signal (c21b), the apparatus makes transition to the battery-powered operation state (d224). In this state, the radio control circuit (C11) makes control to turn off switch circuits (C23, C19) and turn on switch circuits (C24, C18). In this way, the radio control circuit (C11) shuts off power supply from the PCMCIA I/F (b1) and supplies power from the battery (C3) to the radio communication section and the modem section (c2).

Thus, in embodiments of the invention, a circuit configuration is contemplated wherein power source for respective power circuits of the radio communication section and the modem section can be selected from the PC card slot of a personal computer or a battery, or both of them simultaneously. This allows selection of the optimum power supply mode depending on the connection mode and operating state of the apparatus.

In case where a personal computer is operated from commercial power, for example via an AC adapter, power supply from the PC card slot can be semi-permanently received. Thus the battery in the apparatus can be recharged by extra power in an operating state where current consumption of the radio communication section is small.

On the other hand, current consumption of the personal computer is reduced by supplying power to the modem section also from the battery in the apparatus in an operating state where the personal computer is operating from the battery built into the personal computer alone and the battery built into the personal computer is weak, thus prolonging the service hour in total.

Thus, according to the invention, PC card integrated radio communication apparatus is devised, having a battery, a radio communication section and a modem section integrated into a PC card, characterized in that the apparatus is equipped with insertion/non-insertion state detection means for detecting the insertion/non-insertion state of the radio apparatus into a PC card slot; power supply mode selection/power supply means for selecting the power supply mode of the power supply from the battery and/or power supply from the PC card slot depending on the insertion/non-insertion state and the connection state of the radio communication device including attachment of the battery and the operating states of the radio communication section and the modem section to supply power; and charge means for recharging the battery via power supply from the PC card slot, after checking the state of the radio communication section while the insertion/non-insertion state detection means is detecting the insertion state. Thus an advantage is obtained that service hour is prolonged and battery charge is made possible in the operating state where current consumption of the radio communication section is small, by controlling power distribution to each section of the apparatus or to control battery charge for power supply from a PC card slot and power supply from a battery, depending on the power supply state of the personal computer and operating state of the apparatus.

Another advantage is obtained that power supply to the modem section is shut off to reduce power consumption in the modem section in a state where the apparatus is not inserted in the PC card slot.

Another advantage is obtained that, in a state where the apparatus is inserted in the PC card slot and the radio communication section is in the non-communication state, battery discharge can be prevented and apparatus operation can be maintained by supplying power from the PC card slot to the modem section and radio communication section as well as shutting off power supply from the battery.

Another advantage is obtained that, the entire apparatus is deactivated and malfunction of the apparatus is prevented by providing means for detecting insertion/non-insertion of the battery and shutting off power supply from the PC card slot in a state where the apparatus is inserted in the PC card slot and the battery is removed.

Another advantage is obtained that, in a state where the apparatus is inserted in the PC card slot and the radio communication section is in the non-operating state or non-communication state, operation of the apparatus is maintained and the battery is recharged with extra power in a state where the current consumption of the radio communications section is small, such as the non-operating state before the apparatus is powered or non-communication state, by recharging the battery with power supply from the PC card slot.

Another advantage is obtained that, in a state where the apparatus is inserted in the PC card slot and the radio communication section is in the non-operating state or non-communication state, discharge current from the battery is reduced to prolong service hour of the apparatus in a communication state where current consumption of the radio communication section is relatively large, by supplying power simultaneously from the PC card slot and the battery to operate the apparatus.

Another advantage is obtained that, in a state where the apparatus is inserted in the PC card slot and the radio communication section is in the speech communication state, power consumption of the apparatus reduced by the power consumption of the modem section, by shutting off power supply to the modem section.

Another advantage is obtained that, in a state where the apparatus is inserted in the PC card slot, current consumption of the personal computer is reduced, via a control signal or a command from a personal computer, by supplying power to the modem section and the radio communication section from the battery as well as shutting off power supply from the PC card slot in a state where the personal computer is operating from the battery built into the personal computer alone and the battery built into the personal computer is weak, thus prolonging the service hour in total.

Another advantage is obtained that, in a state where the apparatus is inserted in the PC card slot and the radio communication section is in the continuous reception state, signal operation can be maintained without power supply from the battery in a continuous reception state such as packet communications, by supplying power to the modem section and radio communication section from the PC card slot as well as shutting off power supply from the battery.

What is claimed is:

1. A PC card integrated radio communication apparatus comprising:
   a battery;
   a radio communication section;
   a modem section integrated into the PC card;
   insertion/non-insertion state detection means for detecting an inserted and a non-inserted state of said radio apparatus into a PC card slot;
   power supply mode selection/power supply means for selecting the power supply mode of the power supply depending on said state detected by the insertion/non-insertion state detection means and also depending on an operating state of the radio communication section, wherein said power supply mode includes:
   a mode to power one or both of said modem and said radio communication section from said battery and
   a mode to power one or both of said modem and said radio communication section from said PC card slot; and
   charge means for recharging said battery using power from said PC card slot, while said insertion/non-insertion state detection means detects the inserted state.

2. The PC card integrated radio communication apparatus according to claim 1, wherein said power supply mode selection/power supply means shuts off power from said battery to said modem section while said insertion/non-insertion state detection means detects the non-inserted state.

3. The PC card integrated radio communication apparatus according to claim 1, wherein said power supply mode selection/power supply means both supplies power to said modem section and said radio communication section from said PC card slot and shuts off power from said battery while both said insertion/non-insertion state detection means detects the inserted state and said radio communication section is in a non-communication state.

4. The PC card integrated radio communication apparatus according to claim 1, wherein said apparatus has means for detecting a battery insertion state, wherein said power supply mode selection/power supply means shuts off power from said PC card slot while said means for detecting a battery insertion state detects that said battery is removed.

5. The PC card integrated radio communication apparatus according to claim 1, wherein both said power supply mode selection/power supply means supplies power from said PC card slot and said charge means recharges said battery while both said insertion/non-insertion state detection means detects the inserted state and said radio communication section is in the non-operating state or non-communication state.

6. The PC card integrated radio communication apparatus according to claim 1, wherein said power supply mode selection/power supply means selects power supply from said PC card slot and said battery to supply power to said radio communication section while said insertion/non-insertion state detection means detects the inserted state and said radio communication section is in a communication state.

7. The PC card integrated radio communication apparatus according to claim 1, wherein said power supply mode selection/power supply means shuts off power to said modem section while both said insertion/non-insertion state detection means detects the insertion state and said radio communication section is in the speech communication state.

8. The PC card integrated radio communication apparatus according to claim 1, wherein said power supply mode selection/power supply means supplies power to said modem section and radio communication section from said battery and also shuts off power from said PC card slot while said insertion/non-insertion state detection means detects the inserted state and a personal computer connected via said PC card slot issues a control signal or command to said power supply mode selection/power supply means.

9. The PC card integrated radio communication apparatus according to claim 1, wherein said power supply mode selection/power supply means supplies power to both said modem section and radio communication section from said PC card slot and also shuts off power supply from said battery while said insertion/non-insertion state detection means is detecting the inserted state and said radio communication section is in a continuous reception state.

10. A PC card integrated radio communication apparatus comprising:

a battery;

a radio communication section;

a modem section integrated into a PC card;

insertion/non-insertion state detection means for detecting an inserted and a non-inserted state of said radio apparatus into a PC card slot;

means for detecting a communication state;

means for detecting a battery insertion state;

charge means for recharging said battery using power from said PC card slot; and power supply mode selection/power supply means for selecting a power supply mode of the power supply, said power supply mode including:

a mode to power the apparatus from both said battery and said PC card slot when all of said means for detecting a battery insertion state detects an inserted battery, said insertion/non-insertion state detection means detects an inserted state, and said means for detecting a communication state detects a duplex communication state;

a mode to power the apparatus from said PC card slot alone and also to recharge the battery when all of said means for detecting a battery insertion state detects the inserted battery, said insertion/non-insertion state detection means detects the inserted state, and said means for detecting a communication state detects either a continuous reception state or a no communication state;

a mode to power the apparatus from said battery alone when said insertion/non-insertion state detection means detects a non-inserted state;

a mode to power off said modem when either said insertion/non-insertion state detection means detects the non-inserted state or said means for detecting a communication state detects the no communication state when said insertion/non-insertion state detection means detects the inserted state;

a mode to power off the apparatus when said battery insertion state detects a non-inserted battery; and a mode to charge the battery when both said insertion/non-insertion state detection means detects the inserted state and said apparatus is turned off;

wherein said power supply mode can be overridden by a command or control signal from a personal computer connected via said PC card slot to said power supply mode selection/power supply means.

11. A PC card integrated radio communication apparatus comprising: a battery;

a radio communication section;

a modem section integrated into the PC card;

insertion/non-insertion state detection means for detecting an inserted and a non-inserted state of said radio apparatus into a PC card slot;

power supply mode selection/power supply means for selecting the power supply mode of the power supply depending on said state detected by the insertion/non-insertion state detection means and also depending on whether the radio communication section in a communication or non-communication state, wherein said power supply mode includes:

a mode to power one or both of said modem and said radio communication section from said battery and a mode to power one or both of said modem and said radio communication section from said PC card slot; and charge means for recharging said battery using power from said PC card slot, while said insertion/non-insertion state detection means detects the inserted state.

12. The PC card integrated radio communication apparatus according to claim 11, wherein said power supply mode selection/power supply means shuts off power from said battery to said modem section while said insertion/non-insertion state detection means detects the non-inserted state.

13. The PC card integrated radio communication apparatus according to claim 11, wherein said power supply mode selection/power supply means both supplies power to said modem section and said radio communication section from said PC card slot and shuts off power from said battery while both said insertion/non-insertion state detection means detects the inserted state and said radio communication section is in a non-communication state.

14. The PC card integrated radio communication apparatus according to claim 11, wherein said apparatus has means for detecting a battery insertion state, wherein said power supply mode selection/power supply means shuts off power from said PC card slot while said means for detecting a battery insertion state detects that said battery is removed.

15. The PC card integrated radio communication apparatus according to claim 11, wherein both said power supply mode selection/power supply means supplies power from said PC card slot and said charge means recharges said battery while both said insertion/non-insertion state detection means detects the inserted state and said radio communication section is in the non-operating state or non-communication state.

16. The PC card integrated radio communication apparatus according to claim 11, wherein said power supply mode selection/power supply means selects power supply from said PC card slot and said battery to supply power to said radio communication section while said insertion/non-insertion state detection means detects the inserted state and said radio communication section is in a communication state.

17. The PC card integrated radio communication apparatus according to claim 11, wherein said power supply mode selection/power supply means shuts off power to said modem section while both said insertion/non-insertion state detection means detects the insertion state and said radio communication section is in the speech communication state.

18. The PC card integrated radio communication apparatus according to claim 11, wherein said power supply mode selection/power supply means supplies power to said modem section and radio communication section from said battery and also shuts off power from said PC card slot while said insertion/non-insertion state detection means detects the inserted state and a personal computer connected via said PC card slot issues a control signal or command to said power supply mode selection/power supply means.

19. The PC card integrated radio communication apparatus according to claim 11, wherein said power supply mode selection/power supply means supplies power to both said modem section and radio communication section from said PC card slot and also shuts off power supply from said battery while said insertion/non-insertion state detection means is detecting the inserted state and said radio communication section is in a continuous reception state.

* * * * *

UNITED STATES PATENT AND TRADEMARK OFFICE
CERTIFICATE OF CORRECTION

PATENT NO. : 6,804,541 B1
DATED : October 12, 2004
INVENTOR(S) : Muramatsu et al.

It is certified that error appears in the above-identified patent and that said Letters Patent is hereby corrected as shown below:

Title page,
Item [56], References Cited, U.S. PATENT DOCUMENTS, please add the following:
-- 5,969,529 A         10/1999         Eiraku et al. ...................... 324/433 --.
FOREIGN PATENT DOCUMENTS, please add the following:
-- JP    090251063    9/1997
   JP    090269851    10/1997
   JP    100173802    6/1998
   GB    2 325 119 A  11/1998
   EP    0 987 620 A2 3/2000 --.

Signed and Sealed this

Twenty-first Day of June, 2005

JON W. DUDAS
*Director of the United States Patent and Trademark Office*